Sept. 9, 1930.   M. J. ANDERSON   1,775,545
CONVEYING APPARATUS
Filed July 11, 1927   6 Sheets-Sheet 2
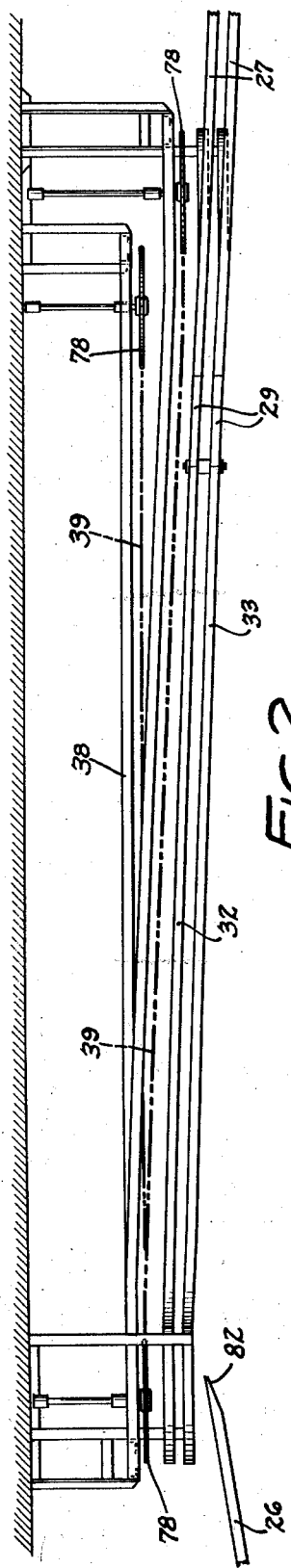
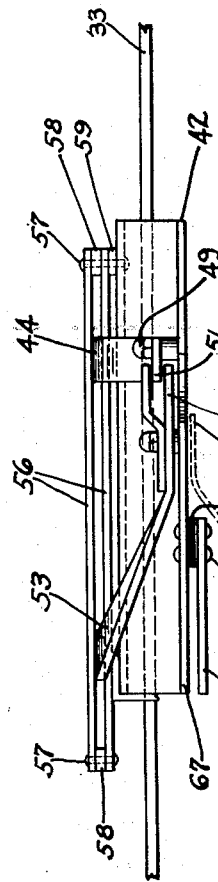
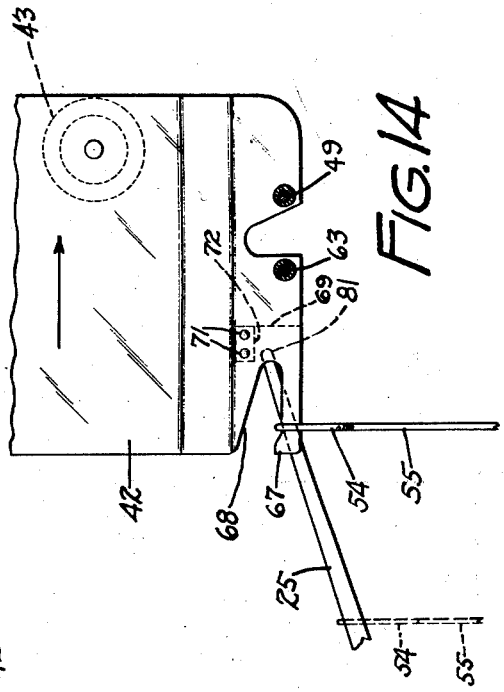
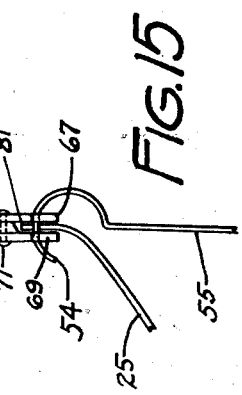
INVENTOR
MARTIN J. ANDERSON
ATTORNEYS

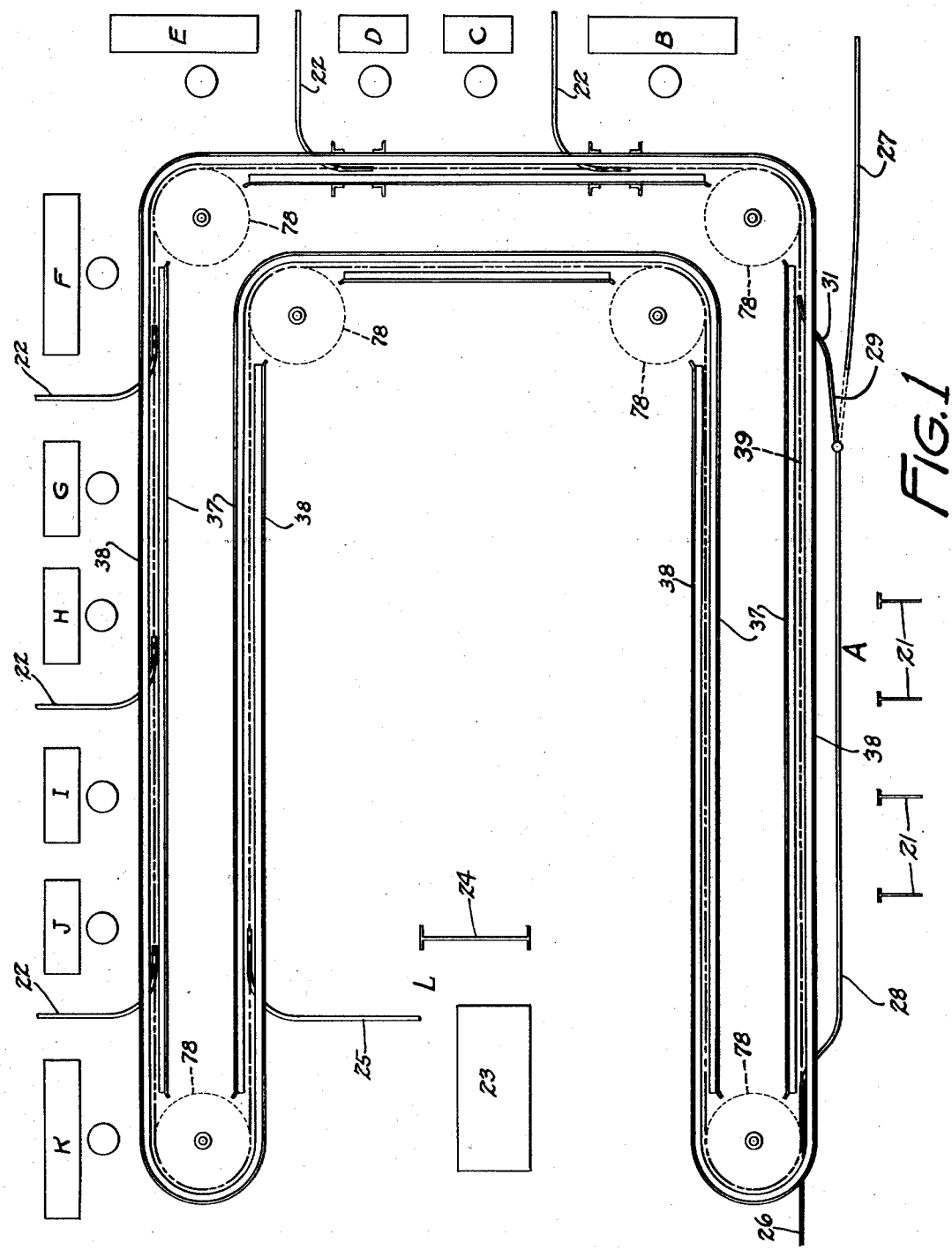

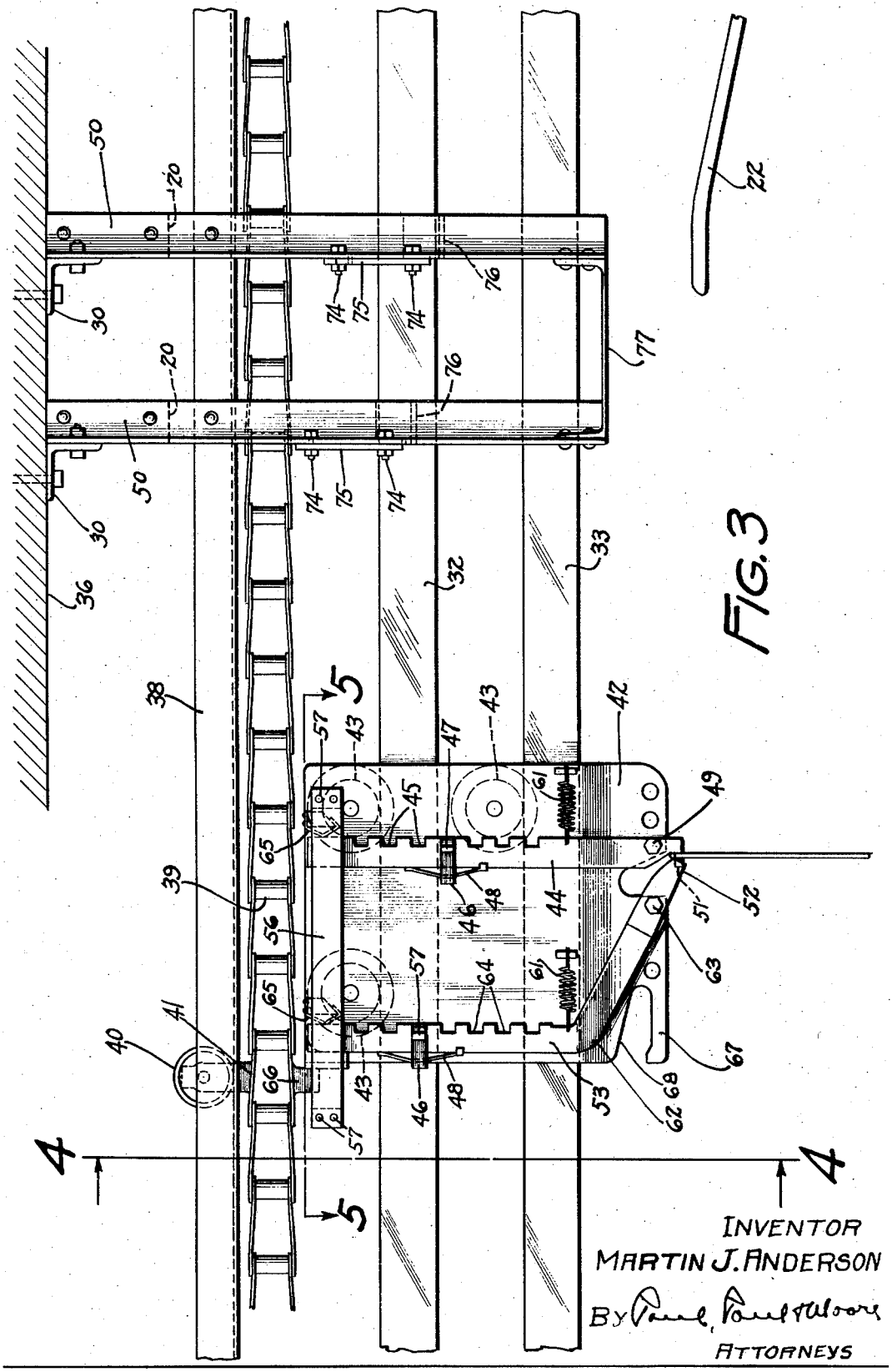

Sept. 9, 1930.    M. J. ANDERSON    1,775,545
CONVEYING APPARATUS
Filed July 11, 1927    6 Sheets-Sheet 4
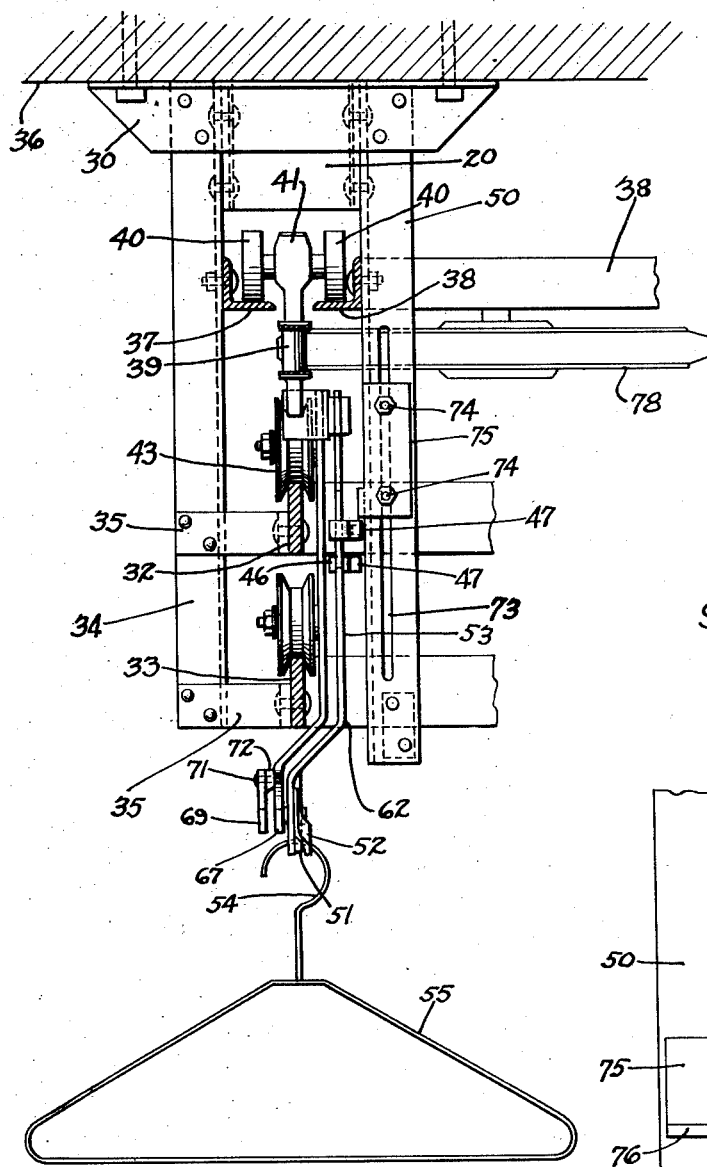
Fig.4
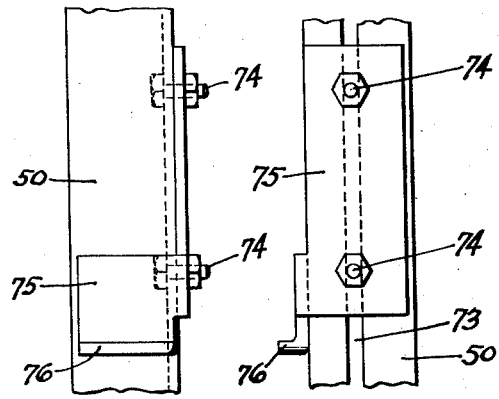
Fig.9
Fig.10
Fig.11   Fig.12
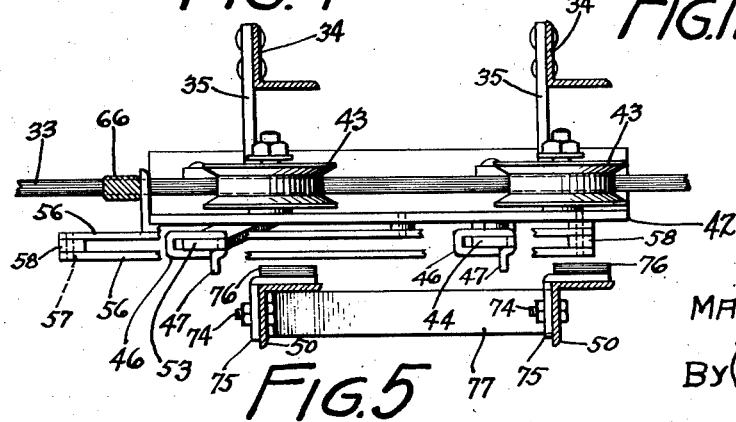
Fig.5
INVENTOR
MARTIN J. ANDERSON
By Paul, Paul & Moore
ATTORNEYS Sept. 9, 1930.  M. J. ANDERSON  1,775,545
CONVEYING APPARATUS
Filed July 11, 1927     6 Sheets-Sheet 5
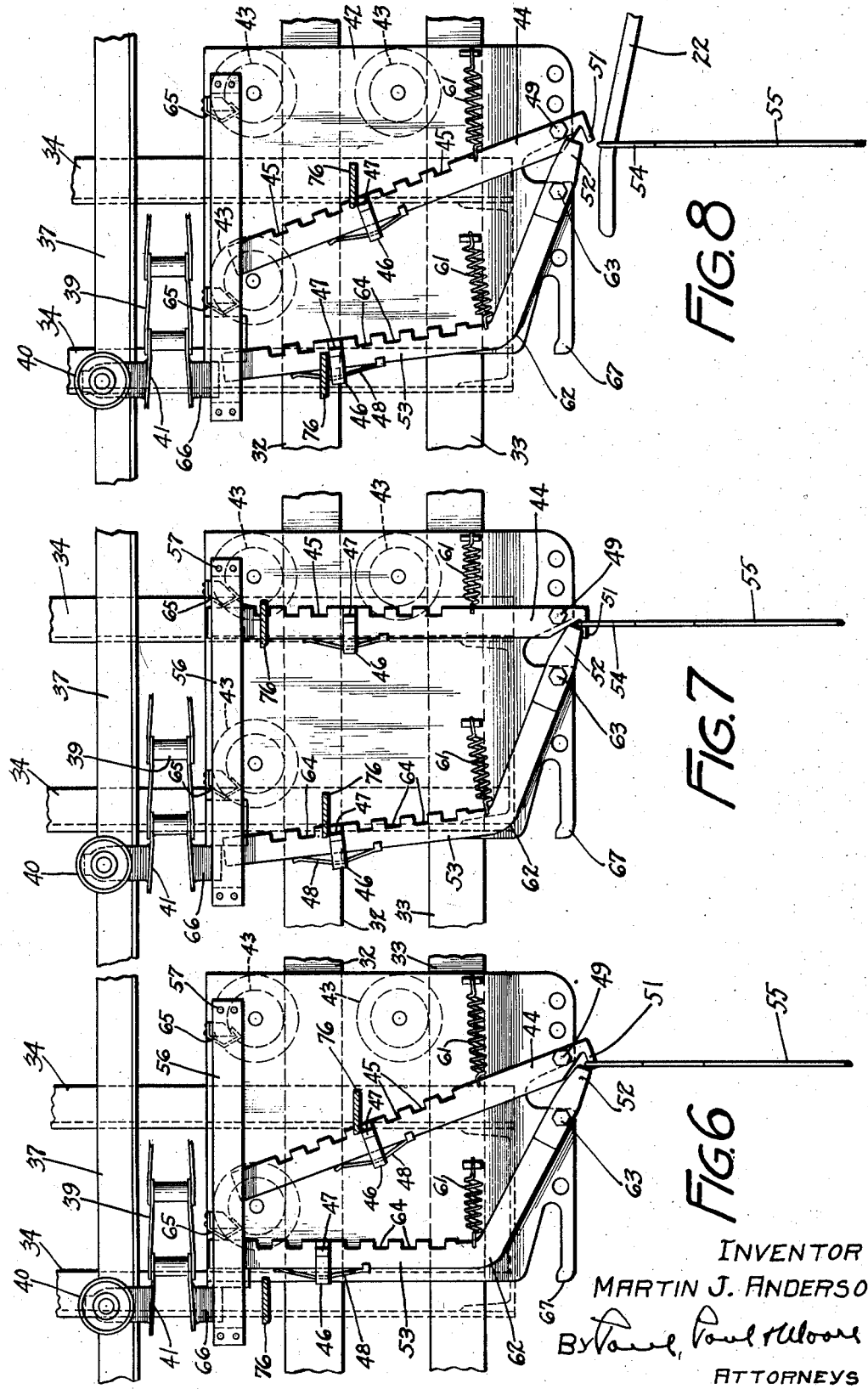
INVENTOR
MARTIN J. ANDERSON
ATTORNEYS

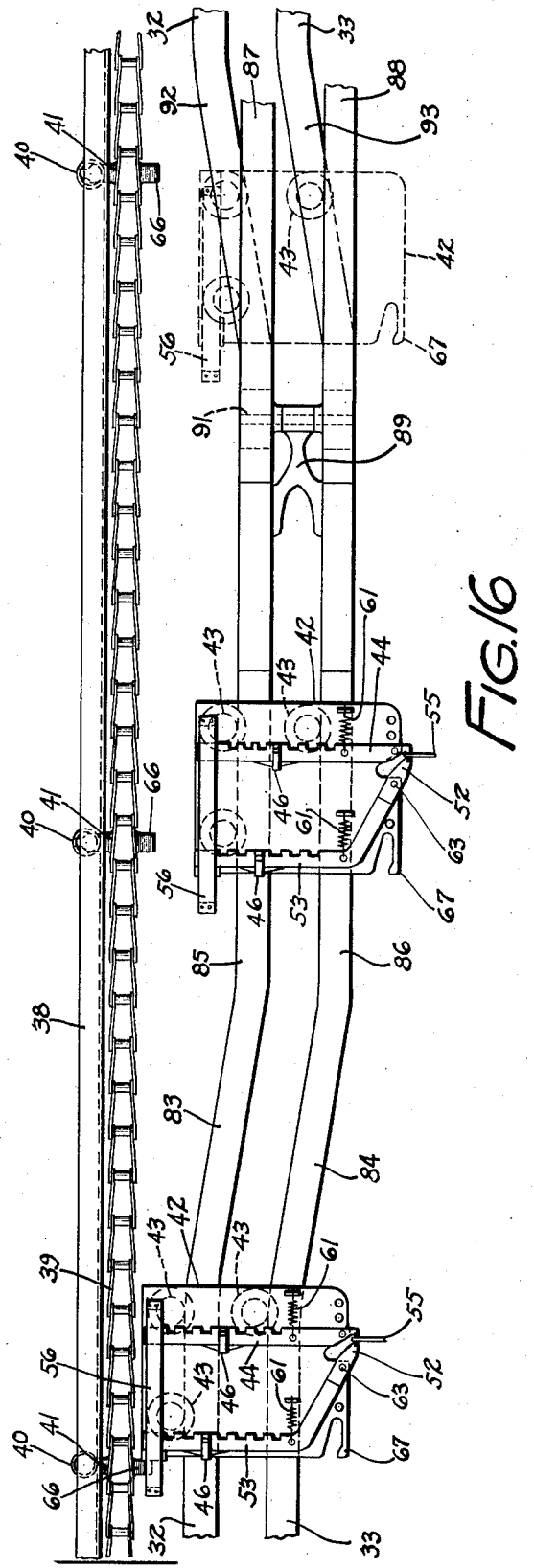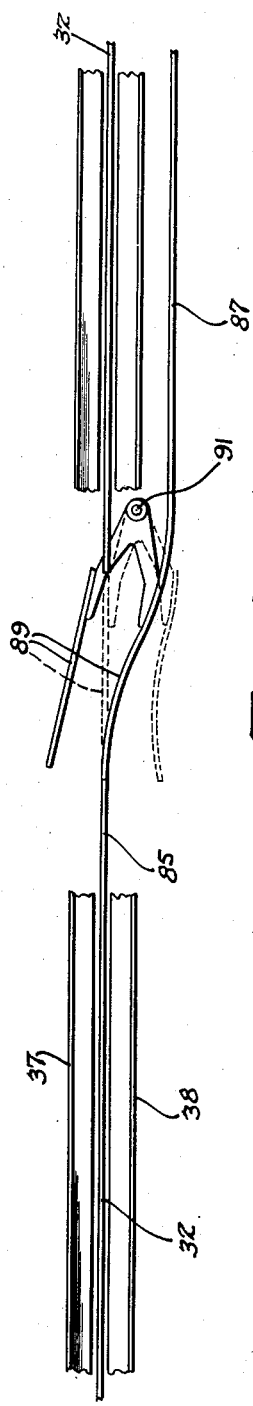

Patented Sept. 9, 1930

1,775,545

UNITED STATES PATENT OFFICE

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYING APPARATUS

Application filed July 11, 1927. Serial No. 204,891.

This invention relates to new and useful improvements in conveying apparatus.

An object of the invention is to provide a conveying apparatus comprising a plurality of carriages adapted to be sent over the system, and each carriage having means adjustably mounted thereon and co-operable with stationary means provided at the various stations for actuating said supporting means to cause the automatic release of the article from the carriage, after which the article will be diverted to a selected station, the empty carriage continuing onward over the system and returning to its starting point for further use.

A further object of the invention is to provide a conveying apparatus comprising a carriage adapted to travel upon a track and having means movably mounted thereon and normally positioned to support an article, and said means having members adjustably mounted thereon and adapted to be engaged by stationary elements to cause said means to be actuated to automatically release the article from the carriage.

A further object is to provide a carriage having a pair of arms pivotally mounted thereon, the lower ends of which co-operate with one another to provide a support for a clothes hanger or other article, and each arm having a member adjustably mounted thereon and adapted to be engaged by stationary means to actuate the arms to cause the release of the clothes hanger therefrom, and the arms of the clothes hanger being so formed and arranged upon the carriage that the arm-actuating members mounted thereon must be simultaneously operated to cause the release of the clothes hanger from the carriage.

A further object is to provide a conveying apparatus including a carriage comprising a backing plate having rollers mounted thereon and adapted to travel upon suitable tracks, and an operating chain being mounted over the carriage and having means thereon adapted to engage the carriage to convey it along the track, and the carriage supporting-track being off-set or depressed at intervals to cause the carriage to be moved out of driving connection with the chain, whereby the movement of the carriage may be interrupted.

A further object is to provide a conveying apparatus including a carriage comprising a pair of notched arms pivotally mounted thereon and having their lower end portions co-operating to provide a support for an article, such as a clothes hanger or similar device and arm-operating members being adjustably mounted upon said arms and adapted to engage stationary means mounted at each station along the conveyor, whereby the arms will be actuated to selectively cause the discharge of the article from the carriage at a predetermined station.

A further object is to provide such a carriage having a hook provided thereon adapted to support a clothes hanger or similar device, and said hook being adapted to pass over an inclined track projecting above the hook, whereby the clothes hanger supported upon the hook, will automatically be removed therefrom and discharged onto the inclined track whereon it will travel by gravity to a desired station or destination.

The particular object of the invention, therefore, is to provide a conveying apparatus comprising a track system having a plurality of carriages adapted to travel thereover, and each carriage being adapted to support an article and having means operable to automatically discharge the article from the carriage, at a predetermined station or destination, after which the carriage will return to the dispatching point or loading station.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 1 is a diagrammatic view illustrating one form of use of the invention;

Figure 2 is a side elevation of Figure 1;

Figure 3 is an enlarged detailed sectional view showing one of the carriages and the means for operating the same;

Figure 4 is a vertical sectional view on the line 4—4 of Figure 3;

Figure 5 is a sectional plan view on the line 5—5 of Figure 3;

Figure 6 is a side elevation of one of the carriages showing the forward clothes hanger supporting arm operated by one of the station stops;

Figure 7 is a similar view showing the rear arm actuated by a stationary stop;

Figure 8 is a similar view showing both clothes hanger supporting arms actuated by stationary stops to cause the release of the clothes hanger therefrom;

Figure 9 is an enlarged detailed sectional view on the line 9—9 of Figure 10;

Figure 10 is a detailed sectional view on the line 10—10 of Figure 9;

Figure 11 is an enlarged detailed sectional view showing one of the station stops;

Figure 12 is a similar view taken at right angles to Figure 11;

Figure 13 is a bottom view of one of the carriages;

Figure 14 is a detailed sectional view showing the means provided at the rear of the carriage for supporting an article;

Figure 15 is an end view of Figure 14;

Figure 16 is a side elevation of a modified construction; and

Figure 17 is a plan view of Figure 16.

In the selected embodiment of the invention here shown, there is illustrated for purposes of disclosure, a conveying system, such as might be used in a dry cleaning establishment. Briefly, this system comprises a dispatching or loading station A, having a plurality of storage racks 21 arranged adjacent thereto, from which the garments are suspended on suitable clothes hangers, not shown. B, C, D, E, F, G, H, I, J, and K illustrate stations or pressing boards arranged at intervals along the main conveyer. Branch or side tracks 22 lead from the main conveyer to the stations, and onto these tracks, the clothes hangers with the garments suspended therefrom, are delivered and are conveyed by gravity to their respective stations.

L represents an inspector's station, usually comprising a table 23 and a storage rack 24. At this station the garments, if passing inspection, are boxed or bagged for shipment. A side track 25 provides means for delivering the garments to the inspector's station L. Storage tracks 26 and 27 are provided at each end of the dispatching station A, upon which the garments may be temporarily stored, as for instance, over night, when the plant is shut down. The track section 28 at the dispatching station has a switch 29 at one end thereof by means of which the garments may be switched from the track section 28 onto the storage track 27. This switch also provides means for diverting the carriages onto a curved track section 31 and back onto the main conveyer.

Figures 3 and 4 illustrate a portion of the main conveyer with a carriage mounted thereon. The conveyer preferably comprises a pair of vertically spaced tracks 32 and 33, supported upon suitable hangers or angle irons 34 by means of brackets 35, each having one end secured to its respective track and their other ends secured to the hangers 34, as particularly shown in Figure 4. These hangers have their upper ends secured to a suitable support, such as the ceiling 36 by such means as angle irons 30. A pair of spaced tracks 37 and 38, preferably of angle iron cross section, are secured to the frame members 34, and to depending frame members or angle irons 50, and are spaced apart as shown in Figure 4 by means of channel irons 20. These tracks provide means for supporting a drive chain 39 supported thereon by suitable rollers 40, mounted upon links 41 of the chain, as shown in Figure 3.

The means provided for conveying the articles or garments over the tracks 32 and 33, is shown in Figures 3 to 8, inclusive, and consists of a carriage comprising a plate 42, having suitable anti-friction flanged wheels or rollers 43 mounted thereon and adapted to travel upon the tracks 32 and 33, as shown. Each carriage has pivotally mounted upon one side thereof, an arm 44 having a plurality of spaced notches 45 provided in one edge thereof, adapted to receive a member 46 having a lug or detent 47 provided upon one side thereof and outwardly extending therefrom as shown in Figure 10. This member is preferably formed of strap iron and encircles the bar or arm 44. A suitable leaf spring 48 is inserted between the member 46 and the opposite edge of the arm 44 as shown in Figure 9, and functions to normally retain the member 46 in adjusted position, as shown in Figures 9 and 10. By thus supporting the member 46 upon the arm 44, it may readily be adjusted thereon to properly position it to cause the arm to be actuated at a selected station. The pivotal connection 49 of the arm 44 with the plate 42 is arranged adjacent the lower end of the arm and also at the lower portion of the plate 42. The lower terminal of the arm is also provided with a hook member 51 co-operating with the lower forked terminal 52 of an arm 53, to provide a supporting means for the upper end or hook 54 of the clothes hanger 55. The upper end of the arm 44 is guidingly supported between a pair of spaced bars 56, secured to the plate 42, preferably by rivets 57, and suitably spaced therefrom by means of spacing blocks 58 and 59, shown in Figure 13. A tension spring 61 has one end secured to the arm 44 and its other end secured to the plate 42 and functions to retain the arm in its normal article-supporting position, shown in Figures 3 and 7.

The arm 53 is preferably bent as shown at 62, and has its lower inclined portion pivotally connected to the plate 42 by means of a pivot pin 63. This arm 53 likewise has one edge provided with a series of notches 64 adapted to adjustably receive a similar member 46, as shown. The upper end of the arm 53 is also guidingly supported between the spaced bars 56, shown in Figure 13. A similar spring 61 tends to retain the arm 53 in its normal position, shown in Figures 3 and 6. Referring to Figure 13, it will be noted that the lower terminal 52 of the arm 53 is forked to receive the hook member 51 of the arm 44. Thus, when the hook 54 of the clothes hanger 55 is supported upon the hook member 51 of the arm 44, as shown in Figure 3, it will be held against accidental removal therefrom, as a result of the hook member 51 being interlocked with the lower terminal 52 of the arm 53. Suitable cushion springs 65 are provided between the bars 56 adapted to be engaged by the arms 44 and 53, when they are moved into the positions shown in Figure 3 by the action of the springs 61.

The carriages are adapted to be operated by means of lugs 66, preferably integrally formed with the links 41 of the conveyer chain 39 as shown in Figure 3. These lugs are adapted to engage the upper left hand corners of the carriages and thus shove them along the track with the movement of the chain.

Each carriage is further provided with a hook member 67 preferably arranged at the lower left hand corner thereof as shown in Figure 3. This hook member 67 is forked, as shown in Figure 13, and is preferably constructed by cutting out a portion of the plate 42 as indicated at 68 in Figure 14, and securing thereto in spaced relation, a plate 69 having a cut-out portion formed to coincide with the cut-out portion 68 of the plate 42. The plate 69 is secured to the plate 42, preferably by rivets 71 and is spaced therefrom by means of a block 72, shown in Figure 13. It will also be noted by reference to Figure 14, that the spacing block 72 is arranged above the hook members 67 of the plates 42 and 69, and further that the plate 69 is mounted on the opposite side of the plate 42 from that upon which the arms 44 and 53 are mounted. (See Figure 13.) The space or gap between the hook members 67 is therefore out of alinement with the lower terminals of the arms 44 and 53.

The means provided for actuating the arms 44 and 53 is best shown in Figures 3, 4, 5, 9, 10, 11, and 12. As shown in Figure 4, each hanger 50 has provided therein an elongated opening or slot 73 adapted to receive bolts 74, adjustably secured to the hangers a pair of arm-actuating members 75, each having an outwardly projecting lug or flange 76 adapted to engage one of the detents 47 of the members 46, which are adjustably mounted upon the arms 44 and 53. These arm-actuating members are adapted to be vertically adjusted upon the hangers 50 to properly position them to actuate the detents 47 of the arms of a certain carriage, when passing thereby, thus causing such carriage to discharge its load onto one of the station side tracks 22, shown in Figure 1 and also in Figures 3 and 8. A spacing channel 77 is preferably provided at the lower ends of the hangers 50.

The conveyer chain 39 is, as hereinbefore stated, supported upon the angle iron tracks 37 and 38, and as shown in Figure 1, is guided by means of sprockets 78. Suitable means, not shown, is provided for operating the conveyer chain 39. The movement of this chain is preferably continuous.

The preferred manner of moving the carriages out of driving engagement with the lugs 66 of the conveyer chain 39, is shown in Figures 1 and 2 and consists in off-setting from the chain 39, the tracks 32 and 33 at the dispatching or loading station A, as shown in Figure 1. It will also be noted by reference to Figure 2, that the tracks 32 and 33 are inclined at the loading station, that is, they descend towards the right hand side of Figure 2 so that when the carriages are moved out of driving engagement with the chain, they may continue onward by gravity over the track section 28. Suitable stops, not shown, may be provided along the track section 28 for interrupting the movement of the carriages while being loaded. After a carriage has been loaded and is released, it will commence to move downwardly by gravity over the track section 28 at the loading station, and, if the switch 29 is in the full line position shown in Figure 1, the carriage will be switched onto the curved track section 31 and into alinement with the chain 39, after which it will be engaged by one of the lugs 66 of the chain and be conveyed over the system until it is returned to the off-set track section 28 at the loading station A, where it will again be moved out of driving connection with the chain.

In order to clearly set forth the advantages and features of this invention, the apparatus is shown as used in a dry cleaning establishment, and covers that portion of the process where garments, which have already been dry cleaned, are sent from a central dispatching point or station to various pressers, and then to an inspector, at which point the garments may be boxed or bagged for delivery. Provision is also made so that garments which do not pass inspection, may be sent back to the dispatching station, from whence they may be returned to the presser to be refinished. In operation, the garments, after having been cleaned, are delivered by suitable means, not shown, to a point adjacent to the dispatcher and are then stored upon the racks 21 where they are hung on the usual clothes hanger. It is the duty of the dispatcher to see to it that each presser is kept supplied with garments to work on. In establishments of this kind, care must be exercised on the part of the dispatcher to see that the proper kind and class of garments are sent to the individual pressers or groups of pressers. In large plants, some pressers are specialists on certain classes of garments, that is, an expensive ladies' garment must be sent to a presser who is a specialist in such high class of work, while other grades of work are sent to less experienced pressers. It is therefore essential and desirable that a conveyer system be provided over which the garments may be dispatched to their respective pressing stations, or to other stations where they are to receive treatment, after which they are again placed upon a carriage and conveyed to the inspector at station L, who inspects them, and if found to pass inspection, they are boxed or bagged for shipment or for temporary storage.

This novel conveying apparatus is particularly adapted for use to thus dispatch garments or other articles from a given point or station to any one of a series of stations along the conveyer. The means provided for thus directing the discharge of the articles from the carriages onto their selected side tracks 22 consists in properly adjusting the positions of the members 46 upon their respective arms 44 and 53, and also to adjust the positions of the arm-actuating members 75 upon the hangers 50 so that they will engage the detents 47 mounted upon the arms of a certain carriage. The detents 47 and the flanges 76 of the members 75 co-operate to actuate the arms 44 and 53 to cause the discharge of the clothes hanger 55 from the lower terminals thereof. After a garment has been placed upon a clothes hanger, the latter is engaged with the hook member 51 of the arm 44, as shown in Figure 3. The clothes hanger is retained upon this hook 51 as a result of the latter being interlocked with the terminal 52 of the arm 53, and before the clothes hanger can be discharged from the hook 51, both arms must be moved to the position shown in Figure 8, wherein it will be noted, that the hook 51 is moved downwardly out of interlocking engagement with the terminal 52 of the arm 53, thus permitting the clothes hanger to drop by gravity onto one of the side tracks 22, a portion of which is shown in Figure 8. Therefore, in order to effect the discharge of the clothes hanger from the carriage, the members 46 and arm-actuating members 76 must be so adjusted as to cause the arms 44 and 53 to be moved simultaneously to the full line positions shown in Figure 8. The actuation of one of the arms only, cannot effect the discharge of the clothes hanger from the carriage, as may be clearly seen by reference to Figures 6 and 7. In Figures 6, the arm 44 is shown moved to the inclined position, shown in Figure 8, but the arm 53 has not been operated and therefore the clothes hanger cannot be discharged from the hook 51. In Figure 7, the arm 53 is shown operated but as a result of the arm 44 not having been operated, the clothes hanger cannot be discharged from the carriage. To discharge the clothes hanger from the carriage, both arms must be operated.

The forked hook 67 at the lower left hand corner of the carriage, when viewed as shown in Figure 3, provides means for supporting upon the carriage, the loaded clothes hangers placed thereon by the pressers at the various pressing stations as they complete their work on the garments. Garments placed upon the hook 67 are dispatched to the inspecting station L for inspection. When a presser has completed his work on a garment, it is placed upon a clothes hanger and the hanger is engaged with the hook 67 of the carriage, as shown in Figures 14 and 15. As the actuation of the arms 44 and 53 has no effect upon a clothes hanger supported upon the hook 67, the clothes hanger thus supported, will continue onward over the system until the side track 25 at the inspector's station L is reached, whereon the clothes hanger will automatically be delivered as a result of the receiving end 81 of the track 25 passing between the hook member 67 of the backing plate 42 and the plate 69 as shown in Figures 14 and 15. The terminal 81 of the side track 25 is elevated above the hook member 67, so that as the carriage passes over the track terminal 81, the clothes hanger 55 will automatically be lifted off the hook 67, after which it will slide by gravity, downwardly over the track 25 to the inspecting station L. The terminal 82, Figure 2, of the storage track 26 is similarly arranged so that, as the empty clothes hangers are returned to the central dispatching station A, they will be delivered onto the storage track 26, where they will be within convenient reach of the dispatcher for reloading.

It is to be understood that, when no garments are being dispatched over the system, the empty carriages may pass over the track section 28 of the dispatching station A, and if the switch 29 is in the full line position shown in Figure 1, they will be switched back in alinement with the conveyer chain, where they will be automatically engaged by the lugs 66 of the chain and may thus be conveyed over the conveyer system several times without changing the station settings. The arm-actuating mechanism is so constructed that the arms will be operated to discharge their load at the particular station to which they are directed. Also, by permitting all carriages to be moved out of driving connection with the chain, the dispatcher may load the interrupted carriages at his convenience and, when loaded, he may direct them to their respective stations by the simple adjustment of the members 46 upon the arms 44 and 53. The arm-actuating lugs or flanges 76 are preferably set for a given setting, and when the settings of the various stations become known to the dispatcher, he can quickly adjust the positions of the detents 47 upon the arms so that they will engage the arm-actuating members 76 of the particular station to which the garment is to be dispatched. For practical reasons, it is desirable that no garments are left over night at the presser's tables at the various stations, and by means of this novel conveying system, all garments which have been dispatched to the various pressing stations may readily and quickly be returned to the dispatcher for storage in a suitable vault over night. The side tracks 25 and 26 may be so arranged as to hinge or switch out of the way, when garments are being sent in for night storage, thus causing the hangers to remain on the carriages until they are delivered to the dispatcher's station A. The switch 29 may then be moved to the dotted line position in Figure 1, after which all carriages, with their respective garments supported upon clothes hangers upon the hooks 67, will be directed onto the storage track 27 which may lead to a suitable storage vault, not shown.

Figures 16 and 17 illustrate a modified form, wherein the carriages are moved out of driving connection with the lugs 66 of the chain 39 by depressing the track sections 32 and 33 sufficiently to cause the carriages to be moved out of driving connection with the lugs. (See Figure 16.) It will be noted that the tracks 32 and 33 are provided respectively with inclined portions 83 and 84. When the carriages travel downwardly over these inclined track portions, they will automatically be moved out of driving connection with the lugs 66, after which they may come to rest upon the horizontal track sections 85 and 86, shown in the central portion of Figure 16. Side tracks 87 and 88 are adapted to be connected respectively with the horizontal track sections 85 and 86 by means of a switch 89, pivotally mounted at 91, as shown in Figure 17. When this switch is in the full line position shown in Figure 17, the carriages will be switched from the horizontal track sections 85 and 86 onto the side tracks 87 and 88, where they may be loaded or temporarily stored. After a carriage has been loaded, it will be returned to the horizontal track portions 85 and 86, and, when the switch 87 is moved to the dotted line position shown in Figure 17, the carriage may manually be moved upwardly over the inclined track portions 92 and 93, back onto the tracks 32 and 33, where the lugs 66 will again engage the carriages and move them over the system, as hereinbefore described.

In the accompanying drawings, I have shown the invention as employed in a dry cleaning establishment, but it is to be understood that I do not wish to confine the invention to this particular class of service. It may well be adapted for use in other industries, such for instance, as packing plants, where the carriages might be conveniently and practically utilized to carry meat products from one department to another by supporting such products upon a suitable hanger which might be attached to the carriage in the manner in which the clothes hangers are attached thereto. It may also be used for various other purposes where it is desired to dispatch hangers having articles or merchandise supported thereon, from one place to another. The use of clothes hangers in connection with the carriages therefore is not essential as other types or forms of devices may be supported upon the interlocking terminals of the arms 44 and 53 in a similar manner and without departing from the invention.

I claim as my invention:

1. The combination with a moving carriage, of an article support suspended therefrom and comprising cooperating members normally locked against premature release, and means for actuating said members to selectively release the article support therefrom at a predetermined point in the travel of the carriage, said means comprising independently movable abutments positioned to be engaged by said side members.

2. The combination with a moving carriage, of an article support suspended therefrom and comprising cooperating members normally locked against premature release, independently adjustable means for actuating said members to selectively release the article support therefrom at a predetermined point in the travel of the carriage, and a branch line extending at an angle to the direction of movement of said carriage and adapted to receive the article support when released from the carriage.

3. The combination with a moving carriage having arms pivotally mounted thereon and cooperating to support an article, of a detent adjustably mounted on each arm, and means fixedly mounted and adapted to be engaged by said detents, whereby said arms will be operated simultaneously to cause the release of the article therefrom at a predetermined point in the travel of the carriage.

4. The combination with a moving carriage having arms provided with cooperating jaws adapted to support a clothes hanger, of independently movable means adapted to be positioned to actuate said arms to cause said jaws to open and release the clothes hanger.

5. The combination with a moving carriage having hanger-engaging jaws thereon, of an article hanger adapted to be suspended from said jaws, a detent adjustably mounted on each jaw, and a member for actuating each detent, said members being adjustably mounted upon fixed supports and adapted to be positioned to simultaneously engage their respective detents, whereby said jaws will be actuated to release the hanger therefrom, at a selected point in the travel of the carriage.

6. In a conveying apparatus, the combination of a track, a carriage mounted to travel thereon, article-supporting members movably mounted upon said carriage and normally locked against premature release, and independently adjustable means arranged adjacent to said track for selectively actuating said article-supporting members to cause the release of the article therefrom, at a predetermined point in the travel of the carriage.

7. In a conveying apparatus, the combination of a track, a carriage mounted to travel thereon, spaced members pivotally mounted upon said carriage and provided with cooperating jaws normally positioned to support an article, and means arranged at intervals along said track and adapted to oscillate said members to cause said jaws to release the article.

8. In a conveying apparatus, the combination of a track having a carriage mounted to travel thereon, arms pivotally mounted upon said carriage and having their lower ends co-operating to support an article, and means mounted for independent movement adjacent to said track and adapted to actuate said arms simultaneously, whereby the article is released therefrom.

9. In a conveying apparatus, the combination of a track having a wheeled carriage mounted to travel thereon, means for operating said carriage, arms pivotally mounted upon the carriage and cooperating to support an article, members adjustably mounted upon said arms, and means mounted adjacent to said track and adapted to engage said members to actuate said arms to cause the release of the article therefrom.

10. In a conveying apparatus, the combination of a track having a carriage mounted to travel thereon, means for operating said carriage, arms pivotally mounted upon said carriage and cooperating to support an article, a member adjustably mounted upon each arm, and means mounted adjacent to said track and adapted to engage said members to cause said arms to be simultaneously actuated, to cause the release of the article therefrom.

11. In a conveying apparatus, the combination of a track having a wheeled carriage mounted to travel thereon, a pair of notched arms pivotally mounted upon said carriage and having their lower terminals normally positioned to support an article, a member adjustably engaged with the notches in each arm, and means positioned adjacent to said track and adapted to engage said members to cause the simultaneous operation of said arms, whereby the article will be released therefrom.

12. In a conveying apparatus, the combination of a track having a carriage mounted to travel thereon, means for operating said carriage, a pair of arms pivotally mounted upon said carriage, and normally having their lower terminals interlocked, a member adjustably mounted upon each arm, and means mounted adjacent to said track and adapted to engage said members to cause the terminals of said arms to be moved out of interlocking engagement to cause the release of the article therefrom.

13. In a conveying apparatus, the combination of a track having a wheeled carriage mounted to travel thereon, a pair of notched arms pivotally mounted upon said carriage and having their lower terminals normally interlocked and adapted to support an article, a member adjustably mounted upon each arm, and means positioned adjacent to said track adapted to be positioned to engage said members whereby said arms will be operated to cause the article to be released therefrom.

14. In a conveying apparatus, the combination of a track having a wheeled carriage mounted to travel thereover, cooperating jaws mounted upon said carriage and normally positioned to support an article, a plurality of receiving stations arranged along said track and each having a branch track, one end of each branch track being positioned beneath said main track and adapted to receive an article, and means mounted for independent movement adjacent to said main track at each station, adapted selectively to cause actuation of said jaws to effect the release of the article therefrom onto a selected side track.

15. In a conveying apparatus, the combination of a track having a wheeled carriage mounted to travel thereon, cooperating members on said carriage normally positioned to support an article, a plurality of receiving stations arranged along said track and each having a branch track, one end of each branch track being positioned beneath said main track, and means mounted for independent movement adjacent to said main track at each station adapted to cause actuation of said article-supporting members and to cause the article to be discharged onto a branch track for delivery to a selected station, and the carriage continuing onward and returning to its starting point.

16. In a conveying apparatus, the combination of a main track, a carriage adapted to travel thereon, arms pivotally mounted upon said carriage and having their lower terminals normally interlocked to provide a support for an article, a detent adjustably mounted upon each arm, a plurality of branch tracks leading from said main track, a frame arranged at the junction of each branch track, arm-actuating members adjustably secured to said frame and adapted to be positioned to engage the detents on said arms whereby the arms will be actuated to cause the discharge of the article from the lower terminals thereof onto a selected branch track.

17. In a conveying apparatus, the combination of a main track having a plurality of branch lines leading therefrom, a carriage mounted to travel on said main track, means for propelling said carriage, a pair of arms pivotally mounted upon said carriage and having their lower terminals normally engaged with one another to provide a support for an article, means for yieldably retaining said arms in their normal operative positions, a detent adjustably secured to each arm, and means mounted at the junction of each branch line adapted to engage said detents to oscillate said arms to cause the terminals thereof to release the article and discharge it onto a selected branch line, when said arms are operated simultaneously.

18. In a conveying apparatus, the combination of a track, a carriage adapted to travel thereon, arms movably mounted upon said carriage and cooperable to support an article, a driving means for the carriage, a branch line leading from said main track, an independent actuating means for each arm located at the junction of said branch line and adapted to be engaged by said actuating means and to automatically cause the discharge of the article from the arms onto said branch line and permitting the carriage to be returned to its starting point, and means at the starting point for moving the carriage out of driving connection with said driving means.

19. In a conveying apparatus, the combination of a main track having a carriage mounted to travel thereon, rails mounted over said main track, a driving chain supported upon said rails and having means adapted to engage said carriage to propel the latter, a plurality of branch lines leading from said main track, movable means on the carriage adapted to support an article, means at the junctions of each branch line adapted to be positioned to operate the movable means on said carriage to cause the discharge of the article therefrom onto a selected branch line, and permitting the return of the carriage to its starting point, and means at the starting point for moving the carriage out of driving connection with said chain.

20. In a conveying apparatus, the combination of a pair of vertically spaced tracks having a carriage mounted to travel thereon, a plurality of branch lines leading from said main track and each having one end positioned beneath said tracks and spaced therefrom, a driving chain arranged over said tracks and having means adapted to engage said carriage for driving the latter, means movably mounted upon said carriage and normally positioned to provide a support for an article, and means provided adjacent the junction of each branch line adapted to engage the movable means on said carriage to cause the latter to release the article and allow it to drop by gravity onto a selected branch track whereon it will travel by gravity to a predetermined station.

21. In a conveying apparatus, the combination of a main track having a carriage mounted to travel thereon, a plurality of branch lines leading from said main track, arms pivotally mounted upon said carriage and normally having their lower terminals positioned to support a clothes hanger, a detent adjustably mounted upon each arm, means mounted at the junction of each branch line adapted to engage the detents of a selected carriage and cause the arms thereof to be actuated to release the clothes hanger and allow it to drop by gravity onto a selected branch line, while the carriage continues onward to its starting point, and auxiliary means provided upon said carriage and adapted to support a clothes hanger independently of said arms and conveying the clothes hanger through following branch lines without interruption.

22. In a conveying apparatus, the combination of a main track having a plurality of branch lines leading therefrom and the receiving end of each branch line being positioned beneath said main track and spaced therefrom, a carriage mounted to travel upon said main track and having means thereon for supporting an article, means at the junction of each branch line adapted to be positioned to actuate the article-supporting means of a certain carriage to cause the discharge of the article therefrom onto a selected branch line, and an auxiliary article-supporting member provided upon said carriage and arranged to automatically discharge its load onto a branch line independently of said first mentioned article-supporting means.

23. In a conveying apparatus, the combination of a carriage comprising a backing plate having a plurality of anti-friction rollers mounted thereon and adapted to travel upon a track, an arm pivotally mounted upon said plate and having a hook member terminally provided thereon, a second arm also pivotally mounted upon said plate and having a forked terminal adapted to co-operate with the hook member on said first mentioned arm to provide a support for a clothes hanger, means for guidingly supporting the upper ends of said arms, spring elements tending normally to retain said arms in their normal operative positions, a detent adjustably mounted upon each arm and adapted to engage stationary means to cause said arms to be operated to discharge the clothes hanger therefrom, a series of notches provided in one edge of each arm adapted to retain said detents in their adjusted positions, the positions of said detents upon said arms controlling the discharge of the clothes hanger from said carriage onto a selected branch line.

24. In a conveying apparatus, the combination of a carriage comprising a plate, a pair of arms pivotally mounted upon said plate and having their lower ends adapted for interlocking engagement to provide a support for a clothes hanger, means for guidingly supporting the upper ends of said arms, a detent adjustably mounted upon each arm and adapted to engage stationary means to cause said arms to be operated to discharge the clothes hanger therefrom onto a selected branch line, and an auxiliary forked hooked member provided upon the lower portion of said plate adapted to support a hanger independently of said arms.

25. In a conveying apparatus, the combination of a main track having a plurality of branch lines leading therefrom and the receiving end of each branch line being positioned beneath said main track and spaced therefrom, a carriage mounted to travel upon said main track and having means thereon for supporting an article, means at the junction of each branch line adapted to actuate the article-supporting means of said carriage to cause the discharge of the article therefrom onto a selected branch line, and an auxiliary article-supporting forked hook member provided upon said carriage and adapted to straddle the terminal of a certain branch line whereby the load will be transferred therefrom onto said branch line, independently of said first mentioned article-supporting means.

In witness whereof, I have hereunto set my hand this 5th day of July, 1927.

MARTIN J. ANDERSON.